(12) United States Patent
Zhou et al.

(10) Patent No.: US 10,845,678 B2
(45) Date of Patent: Nov. 24, 2020

(54) IMAGING APPARATUS

(71) Applicants: Tyco Electronics (Shanghai) Co. Ltd., Shanghai (CN); TE Connectivity Corporation, Berwyn, PA (US)

(72) Inventors: Lei Zhou, Shanghai (CN); Dandan Zhang, Shanghai (CN); Roberto Francisco-Yi Lu, Bellevue, WA (US); Lvhai Hu, Shanghai (CN); Yun Liu, Shanghai (CN)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/270,971

(22) Filed: Feb. 8, 2019

(65) Prior Publication Data

US 2019/0243219 A1 Aug. 8, 2019

(30) Foreign Application Priority Data

Feb. 8, 2018 (CN) .......................... 2018 1 0128769

(51) Int. Cl.
  *G03B 17/56* (2006.01)
  *G02B 21/06* (2006.01)
  *G02B 21/36* (2006.01)
  *F16M 11/20* (2006.01)
  *H04N 5/225* (2006.01)

(52) U.S. Cl.
  CPC ........... *G03B 17/561* (2013.01); *F16M 11/20* (2013.01); *G02B 21/362* (2013.01); *G02B 21/368* (2013.01); *H04N 5/2251* (2013.01); *H04N 5/2253* (2013.01); *G02B 21/06* (2013.01)

(58) Field of Classification Search
  CPC .... G02B 21/06; G02B 21/362; G02B 21/368; G03B 17/561; H04N 5/2253; H04N 5/2251; F16M 11/20
  See application file for complete search history.

(56) References Cited

U.S. PATENT DOCUMENTS

| | | | | |
|---|---|---|---|---|
| 4,865,283 | A * | 9/1989 | Parker | A47F 5/04 248/159 |
| 5,277,392 | A * | 1/1994 | Rossman | F16M 11/126 248/231.71 |
| 2005/0228257 | A1* | 10/2005 | Ishikawa | G02B 21/0012 600/407 |
| 2006/0022096 | A1* | 2/2006 | Chan | F16M 13/02 248/129 |
| 2006/0261228 | A1* | 11/2006 | Hung | F16M 11/10 248/282.1 |
| 2009/0103174 | A1* | 4/2009 | Nozawa | A61B 1/00149 359/376 |
| 2019/0053857 | A1* | 2/2019 | Sugie | A61B 1/04 |

* cited by examiner

*Primary Examiner* — Anner N Holder
(74) *Attorney, Agent, or Firm* — Barley Snyder

(57) ABSTRACT

An imaging apparatus comprises an imaging device configured to capture an image of an object, a display device configured to display the image captured by the imaging device, a base having a support rod extending in a vertical direction, and a mechanical arm mechanism mounted on the support rod. The mechanical arm mechanism has a plurality of motion degrees of freedom. The display device or the imaging device is connected to an end arm of the mechanical arm mechanism.

19 Claims, 4 Drawing Sheets

IMAGING APPARATUS

CROSS-REFERENCE TO RELATED APPLICATION

This application claims the benefit of the filing date under 35 U.S.C. § 119(a)-(d) of Chinese Patent Application No. 201810128769.X, filed on Feb. 8, 2018.

FIELD OF THE INVENTION

The present invention relates to an imaging apparatus and, more particularly, to an imaging apparatus including an imaging device and a display device.

BACKGROUND

An imaging apparatus generally comprises a camera and a display communicating with the camera. The camera is used to capture an image of an object and the display is used to display the image captured by the camera. The imaging apparatus is commonly used in hospitals or factories to detect people or products.

The camera is generally slidably mounted on a bracket and linearly movable in a single direction. The display is generally placed on a table. The camera or the display of the imaging apparatus thereby cannot be moved in a plurality of different directions or rotated about a plurality of different axes and is not convenient in practical application.

SUMMARY

An imaging apparatus comprises an imaging device configured to capture an image of an object, a display device configured to display the image captured by the imaging device, a base having a support rod extending in a vertical direction, and a mechanical arm mechanism mounted on the support rod. The mechanical arm mechanism has a plurality of motion degrees of freedom. The display device or the imaging device is connected to an end arm of the mechanical arm mechanism.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
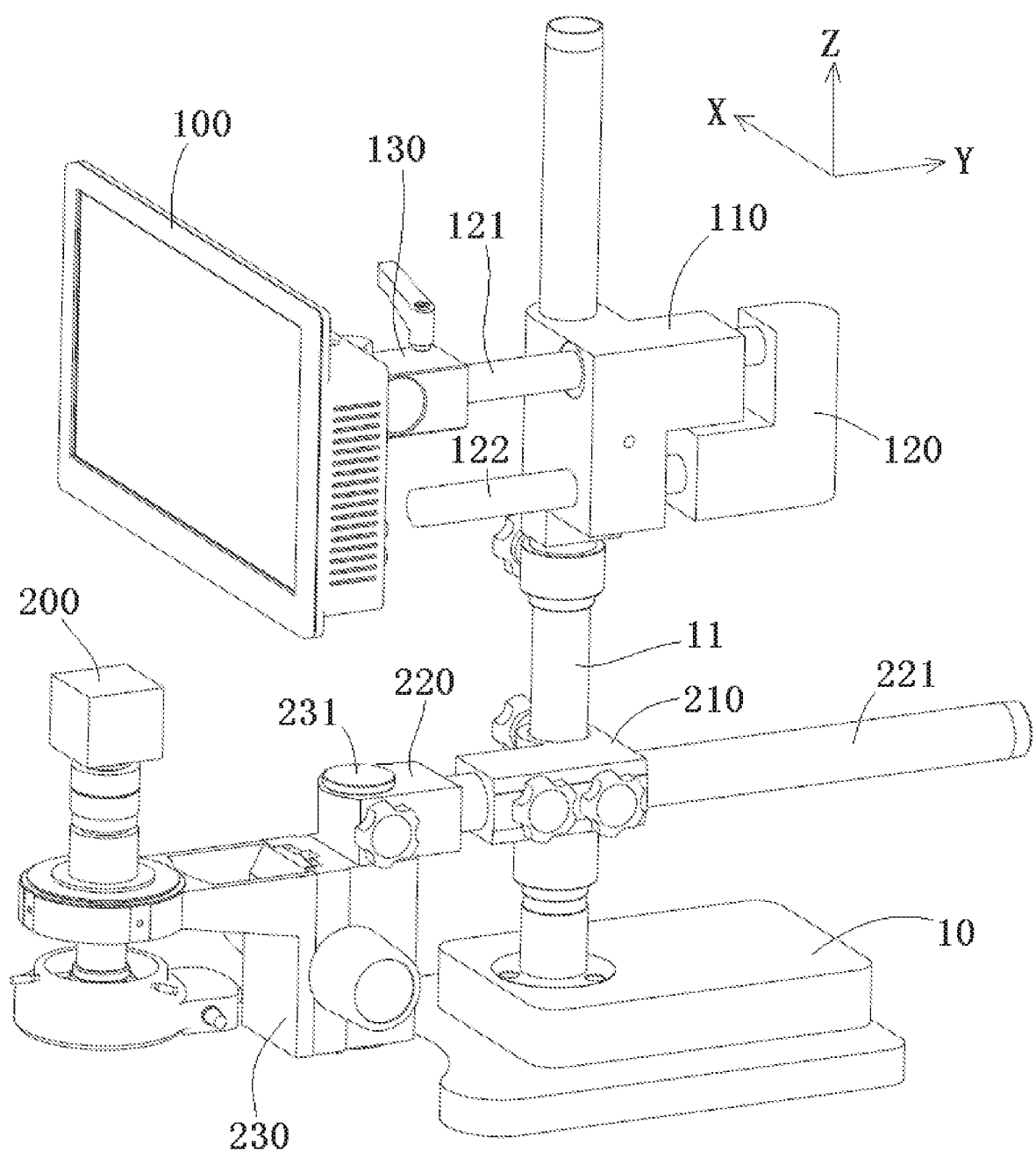
FIG. 1 is a perspective view of an imaging apparatus according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An imaging apparatus according to an embodiment, as shown in FIG. 1, comprises a display device 100, an imaging device 200, a base 10, and a mechanical arm mechanism. The imaging device 200 is configured to capture an image of an object. The display device 100 is configured to display the image captured by the imaging device 200. The base 10 is provided with a support rod 11 thereon that extends in a vertical direction Z.

As shown in FIG. 1, the mechanical arm mechanism is mounted on the support rod 11 and has multiple motion degrees of freedom. The display device 100 or the imaging device 200 is connected to an end arm of the mechanical arm mechanism. The display device 100 or the imaging device 200 may therefore be moved in a plurality of different directions or rotated around a plurality of different axes.

The mechanical arm mechanism includes a first mechanical arm mechanism with multiple motion degrees of freedom mounted on the support rod 11, as shown in FIG. 1. The display device 100 is connected to an end arm of the first mechanical arm mechanism. In an embodiment, the first mechanical arm mechanism is configured to have seven motion degrees of freedom. The first mechanical arm mechanism, as shown in FIGS. 1 and 2, includes a first connection arm 110, a second connection arm 120, a third connection arm 130, a fourth connection arm 140, a fifth connection arm 150, and a sixth connection arm 160.

As shown in FIG. 1, the first connection arm 110 is sleeved on the support rod 11 and configured to be movable along the support rod 11 in a vertical direction Z and rotatable about the support rod 11. The second connection arm 120 includes a first bar 121 which passes through a first hole formed in the first connection arm 110 and is movable relative to the first connection arm 110 in a first horizontal direction Y perpendicular to the vertical direction Z. The second connection arm 120 further includes a second bar 122 which passes through a second hole formed in the first connection arm 110. The second bar 122 is arranged parallel to the first bar 121 and is configured to be movable relative to the first connection arm 110 in the first horizontal direction Y.

Figure 2:
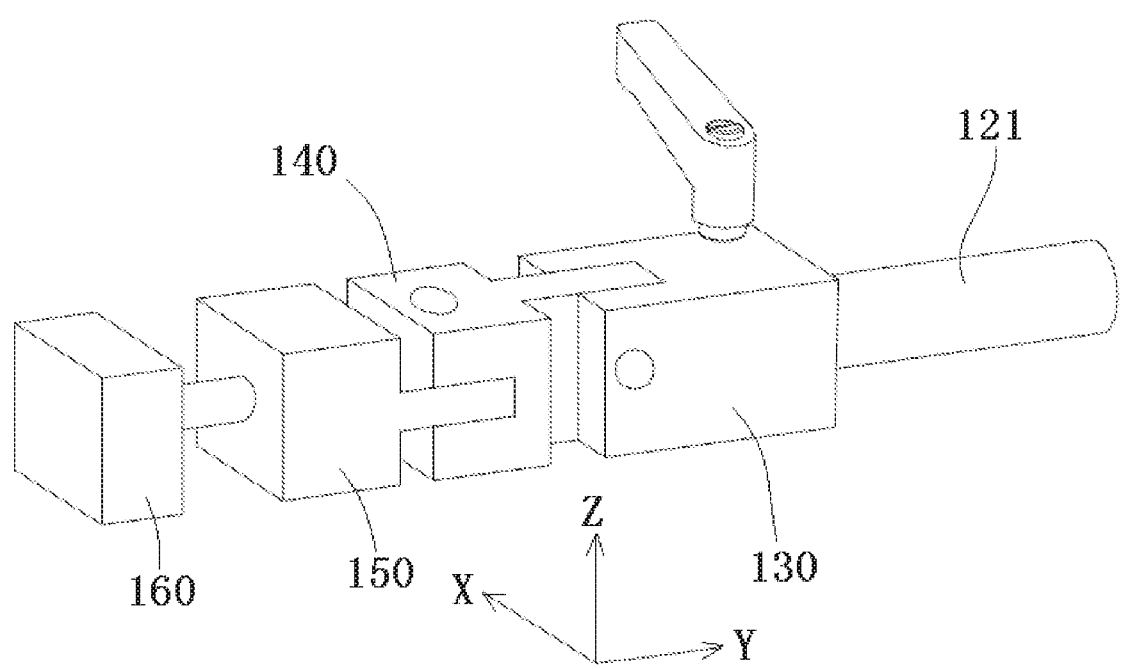
FIG. 2 is a perspective view of a part of a first mechanical arm mechanism of the imaging apparatus of FIG. 1.

A first end of the third connection arm 130 is sleeved on an end of the first bar 121, as shown in FIGS. 1 and 2. The third connection arm 130 is configured to be movable relative to the second connection arm 120 in the first horizontal direction Y and rotatable about the first bar 121.

As shown in FIG. 2, a first end of the fourth connection arm 140 is pivotally connected to a second end of the third connection arm 130 opposite the first end of the third connection arm 130. The fourth connection arm 140 is configured to be rotatable about a horizontal axis extending in a second horizontal direction X perpendicular to the first horizontal direction Y and the vertical direction Z.

As shown in FIG. 2, a first end of the fifth connection arm 150 is pivotally connected to a second end of the fourth connection arm 140 opposite the first end of the fourth connection arm 140. The fifth connection arm 150 is configured to be rotatable about a vertical axis extending in the vertical direction Z.

As shown in FIG. 2, an end of the sixth connection arm 160 is rotatably connected to a second end of the fifth connection arm 150 opposite the first end of the fifth connection arm 150. The sixth connection arm 160 is configured to be rotatable about a horizontal axis extending in the first horizontal direction Y. The display device 100 is fixed to the sixth connection arm 160.

Figure 3:
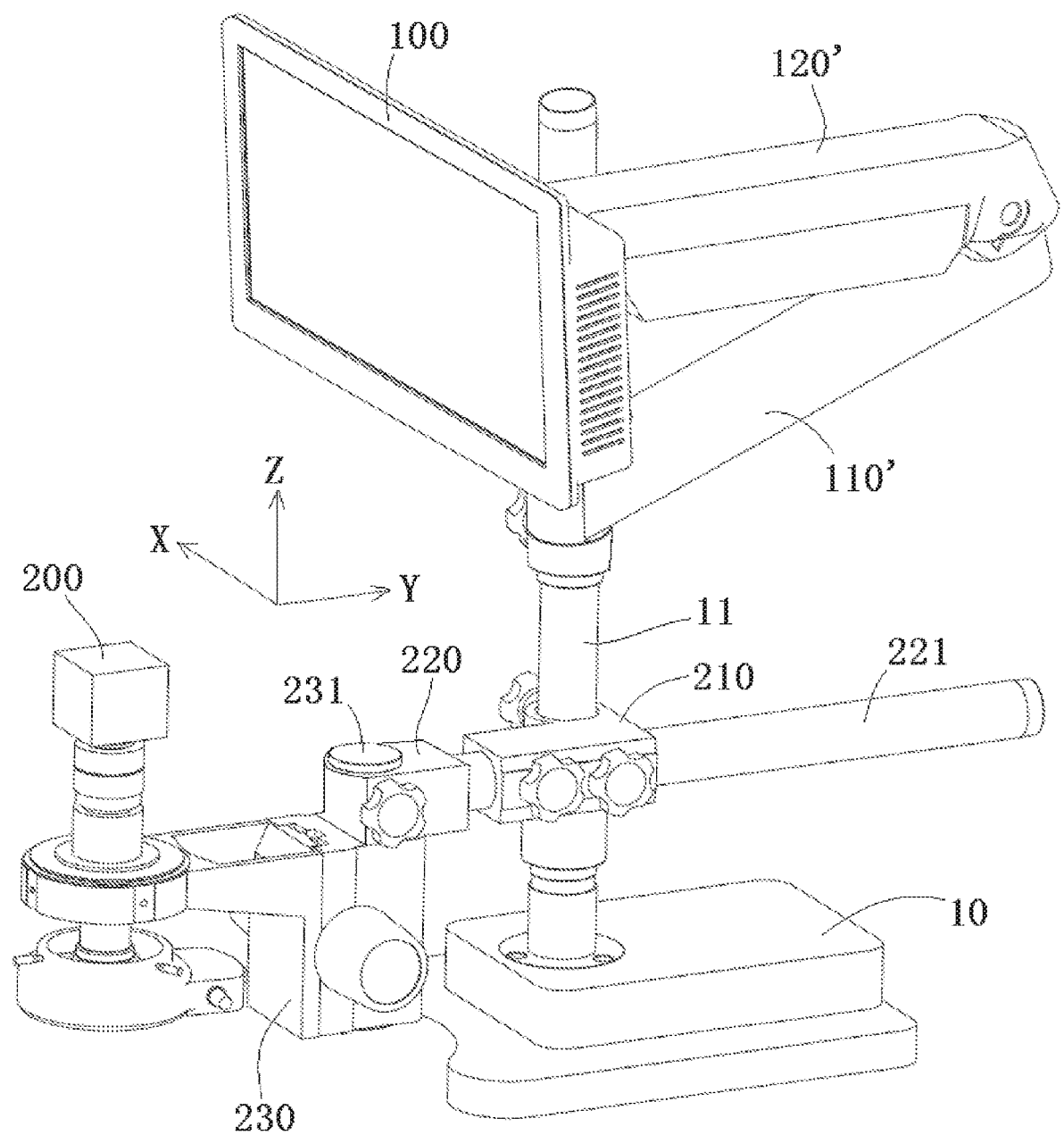
FIG. 3 is a perspective view of an imaging apparatus according to another embodiment.
Figure 4:
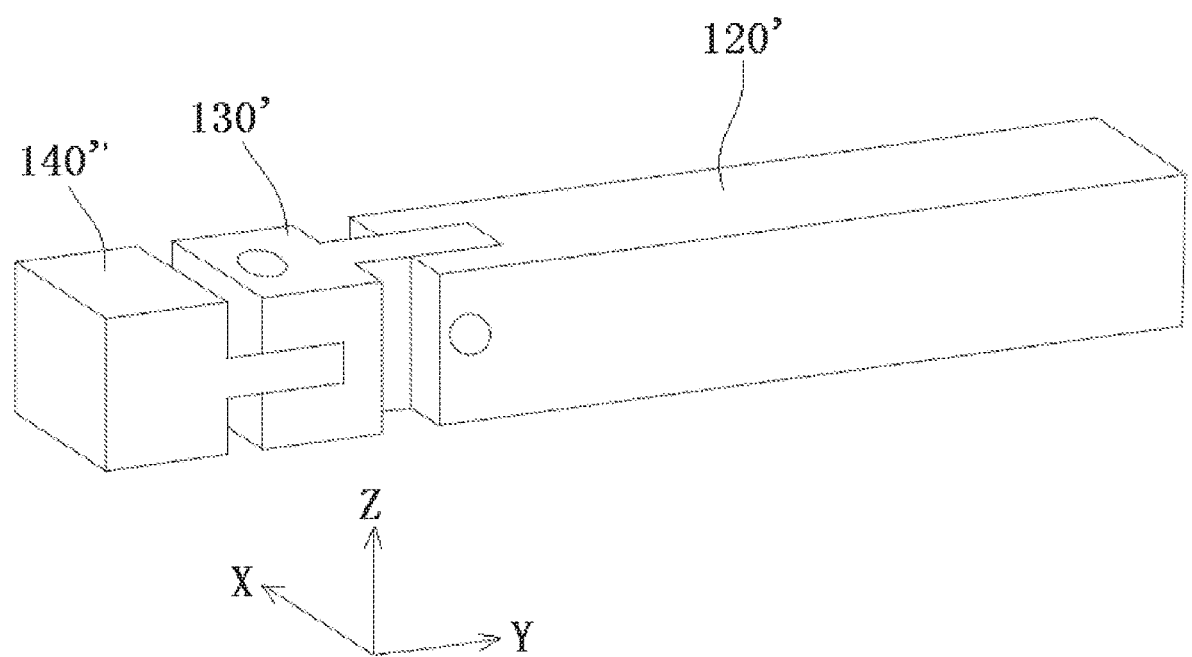
FIG. 4 is a perspective view of a part of a first mechanical arm mechanism of the imaging apparatus of FIG. 3.

In other embodiments, the first mechanical arm mechanism may have three, four, five, six, eight or more motion degrees of freedom. FIGS. 3 and 4 show an embodiment of a first mechanical arm mechanism having five motion degrees of freedom. The first mechanical arm mechanism according to the embodiment shown in FIGS. 3 and 4 includes a first connection arm 110', a second connection arm 120', a third connection arm 130', and a fourth connection arm 140'.

As shown in FIG. 3, a first end of the first connection arm 110' is sleeved on the support rod 11. The first connection arm 110' is configured to be movable along the support rod 11 in the vertical direction Z and rotatable about the support rod 11. A first end of the second connection arm 120' is pivotally connected to a second end of the first connection arm 110' opposite the first end of the first connection arm 110'. The second connection arm 120' is configured to be rotatable about a horizontal axis extending in a horizontal direction X perpendicular to the vertical direction Z.

As shown in FIG. 4, a first end of the third connection arm 130' is pivotally connected to a second end of the second connection arm 120' opposite the first end of the second connection arm 120'. The third connection arm 130' is configured to be rotatable about a horizontal axis extending in the horizontal direction X perpendicular to the vertical direction Z. A first end of the fourth connection arm 140' is pivotally connected to a second end of the third connection arm 130' opposite the first end of the third connection arm 130'. The fourth connection arm 140' is configured to be rotatable about a vertical axis extending in the vertical direction Z. The display device 100 is fixed to the fourth connection arm 140' as shown in FIG. 3.

As shown in FIGS. 1 and 3, the mechanical arm mechanism includes a second mechanical arm mechanism with multiple motion degrees of freedom mounted on the support rod 11. The imaging device 200 is connected to an end arm of the second mechanical arm mechanism. The second mechanical arm mechanism is configured to have five motion degrees of freedom and includes a seventh connection arm 210, an eighth connection arm 220, and a ninth connection arm 230.

As shown in FIGS. 1 and 3, the seventh connection arm 210 is sleeved on the support rod 11 and configured to be movable along the support rod 11 in the vertical direction Z and rotatable about the support rod 11. The eighth connection arm 220 has a horizontal bar 221 which passes through a horizontal hole formed in the seventh connection arm 210. The eighth connection arm 220 is configured to be movable relative to the seventh connection arm 210 in a horizontal direction Y. The ninth connection arm 230 has a vertical bar 231. The vertical bar 231 passes through a vertical hole formed in the eighth connection arm 220. The ninth connection arm 230 is configured to be movable relative to the eighth connection arm 220 in the vertical direction Z and rotatable about the vertical bar 231. The imaging device 200 is fixed to the ninth connection arm 230.

In an embodiment, the imaging device 200 comprises a camera and a microscope mounted on the camera. The imaging device 200 may further comprise a lighting unit mounted on the microscope and configured to illuminate the object to be photographed.

In the above embodiments, a locking device may be provided at each joint of the mechanical arm mechanism. In this way, each joint may be locked at a predetermined position or angle by the locking device. In the embodiments shown in FIGS. 1-4, the locking device may be a threaded locking member.

What is claimed is:

1. An imaging apparatus, comprising:
   an imaging device configured to capture an image of an object;
   a display device configured to display the image captured by the imaging device;
   a base having a support rod extending in a vertical direction; and
   a mechanical arm mechanism mounted on the support rod and having a plurality of motion degrees of freedom, the mechanical arm mechanism including a first mechanical arm mechanism having a first connection arm sleeved on the support rod and configured to be movable along the support rod in the vertical direction and rotatable about the support rod,
   wherein the display device is connected to an end arm of the first mechanical arm mechanism.

2. The imaging apparatus of claim 1, wherein the first mechanical arm mechanism has seven motion degrees of freedom.

3. The imaging apparatus of claim 2, wherein the first mechanical arm mechanism further includes:
   a second connection arm including a first bar extending through a first hole in the first connection arm, the second connection arm is movable relative to the first connection arm in a first horizontal direction;
   a third connection arm having a first end sleeved on an end of the first bar, the third connection arm configured to be movable relative to the second connection arm in the first horizontal direction and rotatable about the first bar;
   a fourth connection arm having a first end pivotally connected to a second end of the third connection arm opposite the first end of the third connection arm, the fourth connection arm configured to be rotatable about a horizontal axis extending in a second horizontal direction perpendicular to the first horizontal direction;
   a fifth connection arm having a first end pivotally connected to a second end of the fourth connection arm opposite the first end of the fourth connection arm, the fifth connection arm configured to be rotatable about a vertical axis extending in the vertical direction; and
   a sixth connection arm having a first end pivotally connected to a second end of the fifth connection arm opposite the first end of the fifth connection arm, the sixth connection arm configured to be rotatable about a horizontal axis extending in the first horizontal direction.

4. The imaging apparatus of claim 3, wherein the display device is fixed to the sixth connection arm.

5. The imaging apparatus of claim 1, wherein the first mechanical arm mechanism has five motion degrees of freedom.

6. An imaging apparatus comprising:
   an imaging device configured to capture an image of an object;
   a display device configured to display the image captured by the imaging device;

a base having a support rod extending in a vertical direction; and a mechanical arm mechanism including a first mechanical arm mechanism mounted on the support rod and having multiple motion degrees of freedom including:

a first connection arm having a first end sleeved on the support rod, the first connection arm configured to be movable along the support rod in the vertical direction and rotatable about the support rod;

a second connection arm having a first end pivotally connected to a second end of the first connection arm opposite the first end of the first connection arm, the second connection arm configured to be rotatable about a horizontal axis extending in a horizontal direction;

a third connection arm having a first end pivotally connected to a second end of the second connection arm opposite the first end of the second connection arm, the third connection arm configured to be rotatable about the horizontal axis extending in the horizontal direction; and a fourth connection arm having an end pivotally connected to a second end of the third connection arm opposite the first end of the third connection arm, the fourth connection arm configured to be rotatable about a vertical axis extending in the vertical direction, wherein the display device is connected to an end arm of the first mechanical arm mechanism.

7. The imaging apparatus of claim 6, wherein the display device is fixed to the fourth connection arm.

8. The imaging apparatus of claim 1, wherein the mechanical arm mechanism includes a second mechanical arm mechanism mounted on the support rod and having a plurality of motion degrees of freedom.

9. The imaging apparatus of claim 8, wherein the imaging device is connected to an end arm of the second mechanical arm mechanism.

10. The imaging apparatus of claim 9, wherein the second mechanical arm mechanism has five motion degrees of freedom.

11. The imaging apparatus of claim 10, wherein the second mechanical arm mechanism includes:

a seventh connection arm sleeved on the support rod and configured to be movable along the support rod in the vertical direction and rotatable about the support rod;

an eighth connection arm having a horizontal bar extending through a horizontal hole in the seventh connection arm and configured to be movable relative to the seventh connection arm in a horizontal direction; and a ninth connection arm having a vertical bar extending through a vertical hole in the eighth connection arm and configured to be movable relative to the eighth connection arm in the vertical direction and rotatable about the vertical bar.

12. The imaging apparatus of claim 11, wherein the imaging device is fixed to the ninth connection arm.

13. The imaging apparatus of claim 1, wherein the imaging device comprises a camera and a microscope mounted on the camera.

14. The imaging apparatus of claim 13, wherein the imaging device comprises a lighting unit mounted on the microscope and configured to illuminate the object.

15. The imaging apparatus of claim 1, wherein the first mechanical arm mechanism further includes a second connection arm including a first bar extending through a first hole in the first connection arm, the second connection arm is movable relative to the first connection arm in a first horizontal direction.

16. The imaging apparatus of claim 15, wherein the second connection arm has a second bar extending through a second hole in the first connection arm.

17. The imaging apparatus of claim 16, wherein the second bar is parallel to the first bar and is configured to be movable relative to the first connection arm in the first horizontal direction.

18. The imaging apparatus of claim 1, wherein the first mechanical arm mechanism further includes a second connection arm having a first end pivotally connected to a second end of the first connection arm opposite a first end of the first connection arm sleeved on the support rod, the second connection arm configured to be rotatable about a horizontal axis extending in a horizontal direction.

19. An imaging apparatus, comprising:

an imaging device configured to capture an image of an object;

a display device configured to display the image captured by the imaging device;

a base having a support rod extending in a vertical direction; and a mechanical arm mechanism including:

a first mechanical arm mechanism mounted on the support rod and having a plurality of motion degrees of freedom, wherein the display device is connected to an end arm of the first mechanical arm mechanism; and a second mechanical arm mechanism mounted on the support rod and having a plurality of motion degrees of freedom, a second mechanical arm supporting the imagining device and including:

a first connection arm sleeved on the support rod and configured to be movable along the support rod in the vertical direction and rotatable about the support rod;

a second connection arm having a horizontal bar extending through a horizontal hole in the first connection arm and configured to be movable relative to the first connection arm in a horizontal direction; and a third connection arm having a vertical bar extending through a vertical hole in the second connection arm and configured to be movable relative to the second connection arm in the vertical direction and rotatable about the vertical bar.

* * * * *